UNITED STATES PATENT OFFICE.

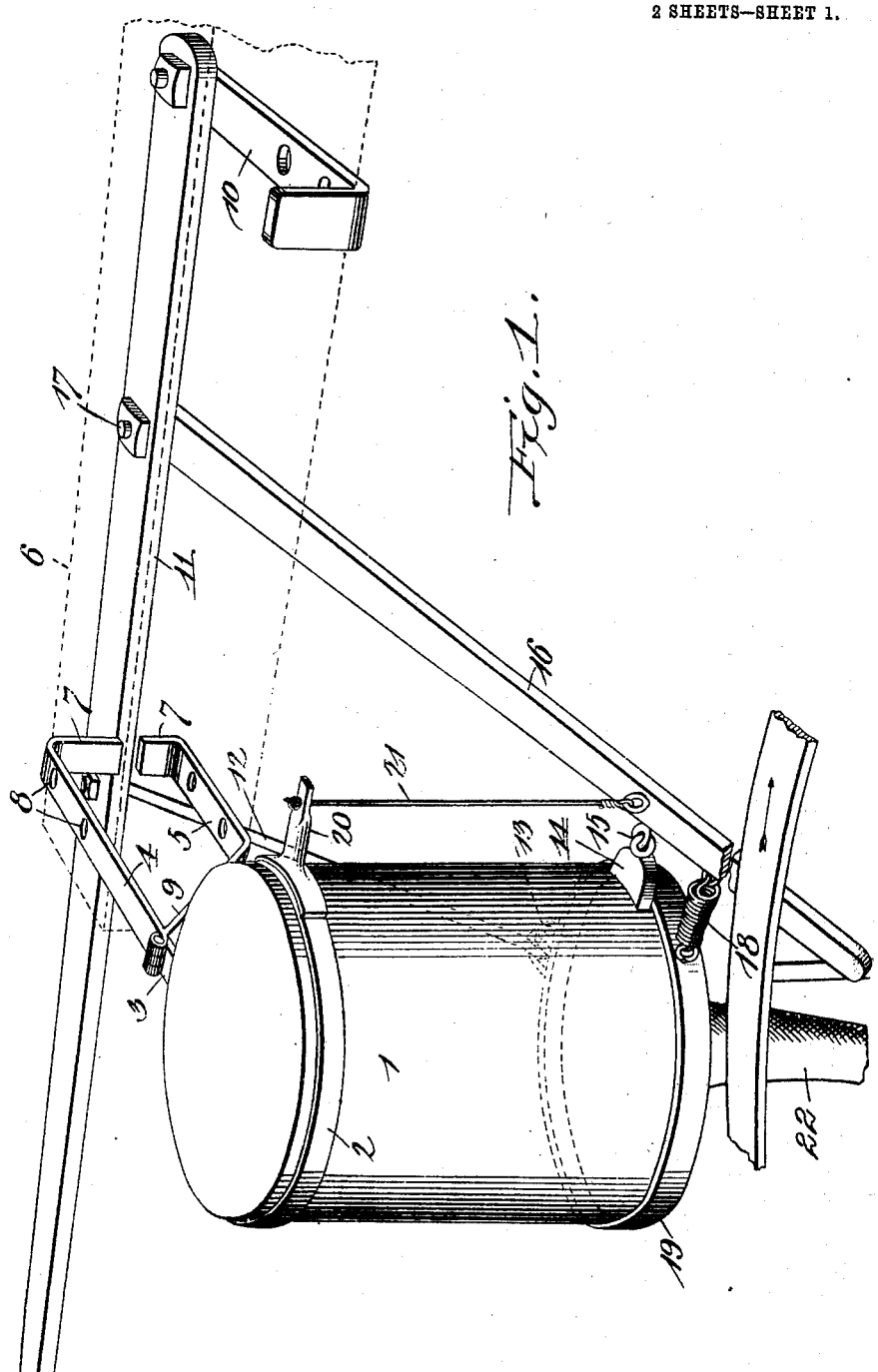

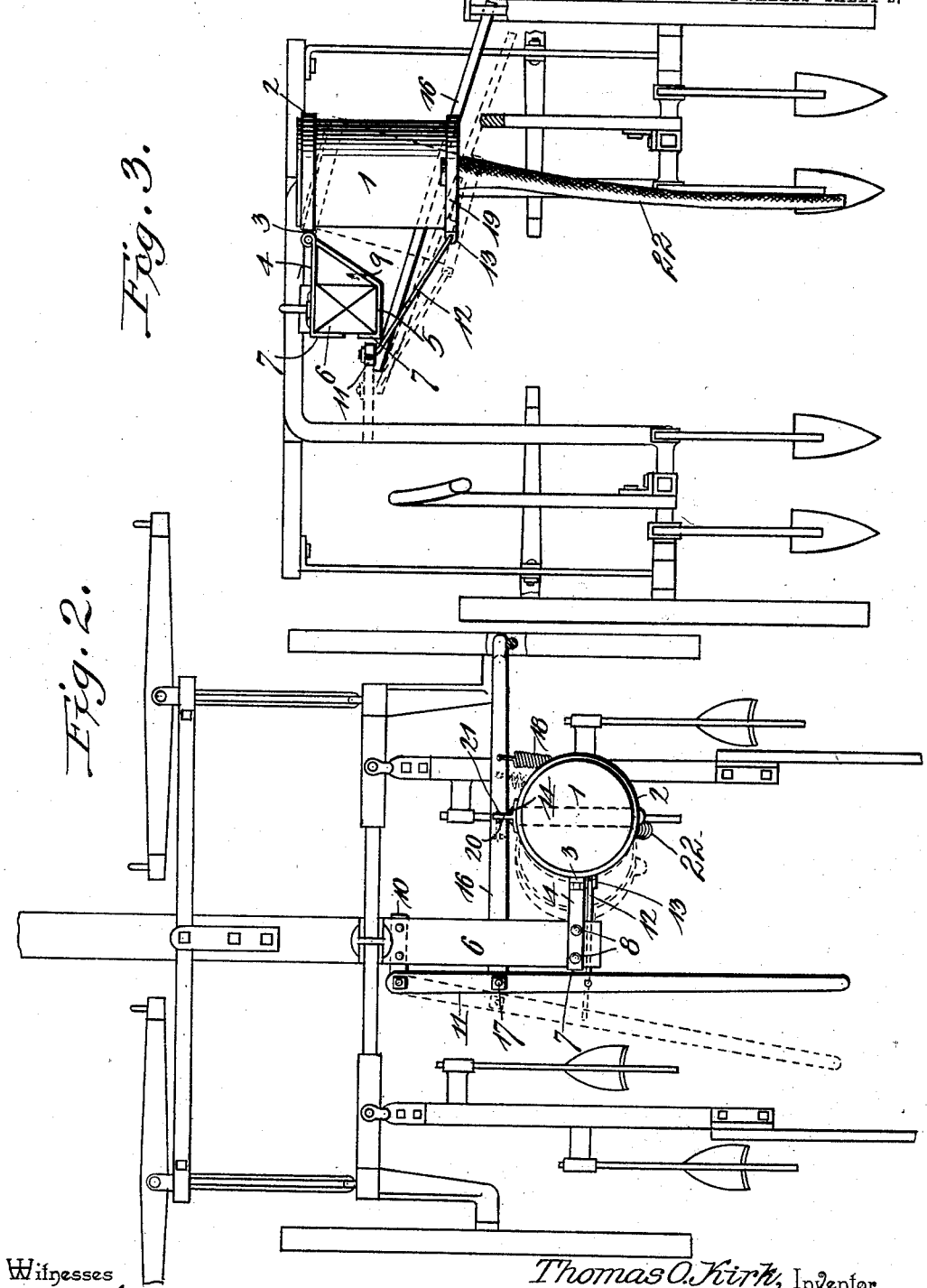

THOMAS O. KIRK, OF FORDLAND, MISSOURI.

SEED-PLANTING ATTACHMENT FOR CULTIVATORS.

SPECIFICATION forming part of Letters Patent No. 718,938, dated January 20, 1903.

Application filed October 9, 1902. Serial No. 126,612. (No model.)

*To all whom it may concern:*

Be it known that I, THOMAS O. KIRK, a citizen of the United States, residing at Fordland, in the county of Webster and State of Missouri, have invented a new and useful Seed-Planting Attachment for Cultivators, of which the following is a specification.

This invention relates to seed-planting attachments for cultivators; and it has for its object to provide a device of this class which shall be exceedingly simple in construction, so that it may be provided at a moderate expense, which shall be capable of being easily attached to the beam of an ordinary cultivator for the purpose of sowing or drilling seeds of various kinds, and which may be easily thrown into or out of operative position by simply swinging or tilting it upon a hinge, whereby it is connected with the supporting-bracket attached to the beam.

With these ends in view the invention consists in the improved construction, arrangement, and combination of parts, which will be hereinafter fully described, and particularly pointed out in the claims.

In the accompanying drawings, Figure 1 is a perspective view of a seed-planting attachment for cultivators constructed in accordance with the principles of my invention. Fig. 2 is a plan view of a cultivator, showing my improved seed-planting device attached thereto in position for operation. Fig. 3 is a rear elevation of the device as shown in Fig. 2, one of the cultivator-handles being broken away.

Corresponding parts in the several figures are indicated by like numerals of reference.

The hopper 1 of my improved device, which may consist of an ordinary metallic bucket, is provided near its upper edge with a strap or band 2, having a lateral extension 3, which is hingedly connected with a pair of hooked straps 4 and 5, the upper one of which engages the upper side and the lower one of which engages the under side of the cultivator-beam 6 when the device is mounted upon the latter in position for operation. The hooked ends 7 of the straps or arms 4 and 5 are adapted to engage one side of the cultivator-beam, and said straps or arms are provided with perforations 8 to admit bolts or other fastening means. The upper arm 4 is wider than the cultivator-beam, thus supporting the hopper 1 at a distance from the latter. The lower arm 5 has an inclined portion 9, which permits the lower end of the hopper to be tilted or swung in the direction of the cultivator-beam.

10 designates a plate or bracket which is secured to the under side of the cultivator-beam and which extends laterally from the latter in the direction opposite to that upon which the hopper is mounted. A lever 11, which is pivotally connected with the said bracket, is extended rearwardly to a point within convenient reach of the operator, and said lever has an arm 12, the lower end of which is connected by a hinge 13 with the lower edge of the hopper. The seeding mechanism within the hopper forms no part of my present invention and is not herein shown, but it comprises as one of its elements a longitudinally-reciprocating seed-slide 14, the front end of which is clearly shown in Fig. 1 of the drawings. The front end of the seed-slide is flexibly connected, as by a link connection 15, with a tappet-arm 16, which has pivotal connection at 17 with the lever 11 and which is extended so as to lie in the path of the spokes of one of the cultivator-wheels when the device is in position for operation. A spring 18 connects the tappet-arm with the front side of a reinforcing-band 19 at the lower end of the bucket, said spring serving to retract the tappet-arm and the seed-slide from the forward movement imparted thereto by the spokes of the cultivator-wheel when the device is progressing over a field.

The band 2 at the upper edge of the hopper has a forwardly-extending arm 20, which is connected by a supporting rod or wire 21 with the tappet-arm 16, thus carrying the weight of the latter and preventing it from bearing with undue pressure upon the seed-slide, and thus interfering with the operation of the latter. The retracting-spring 18 will at the same time and by the same means be relieved from sagging.

A flexible hose or spout 22 may be employed to lead or conduct the seed from the hopper to the furrows formed by the blades of the cultivator.

The operation and advantages of this invention will be readily understood from the foregoing description, taken in connection with the drawings hereto annexed.

When the attachment has been mounted upon a cultivator in operative position and the cultivator moves in a forward direction, the spokes of one of the wheels will successively engage the tappet-arm, moving the latter and the seed-slide connected therewith in a forward direction, while the spring 18 serves to retract the parts as soon as the tappet-arm has its outer end removed from engagement with the spoke. In order to throw the device out of operation, it is only necessary to move the end or handle of the lever 11 in the direction away from the engaged wheel of the cultivator until the tappet-arm 16 shall be removed from the path of the spokes. To accomplish this movement necessitates a tilting movement of the hopper, which is accomplished by the connecting-arm 12 having hinged connection with the lower end of said hopper, its upper end being connected with the lever 11. The hinge connection 3 enables the hopper to be tilted or swung to the desired extent, and the inclined portion 9 of the clamp, comprising the hook members 4 and 5, enables the hopper to be swung, as will be readily understood.

Means may be provided for retaining the lever 11 at any point of adjustment; but such means being well known and in common use they have not been shown in the drawings.

It will be noticed that my improved device may be very quickly and conveniently mounted upon or detached from a cultivator, the hinged flange members 4 and 5 coacting to engage the cultivator-beam, with which they are detachably connected. The only remaining point of attachment is that of the lever 11, which is detachably connected, by means of its fulcrum pin or bolt, with the bracket 10.

I desire it to be understood that I do not limit myself to precise details of construction herein shown and described, but reserve the right to all such alterations and modifications as may be resorted to without departing from the spirit and scope of my invention or sacrificing the utility of the same.

Having thus described my invention, what I claim is—

1. In a device of the class described, a hopper having a lateral extension at its upper edge, and tongue-engaging hooked clamp members hingedly connected with said lateral extension, one of said members having a portion thereof inclined downwardly and outwardly from the hinge.

2. In a device of the class described, a hopper provided at its upper edge with a reinforcing-band having a lateral extension and a forwardly-extending arm, in combination with tongue-clamping members hingedly connected with the lateral extension, a lever fulcrumed to a fixed point in advance of the hopper, a tappet-arm connected pivotally with said lever, a supporting member connecting said tappet-arm with the arm extending forwardly from the reinforcing-band of the hopper, a seed-slide connecting flexibly with the tappet-arm and a retracting-spring connecting the tappet-arm with the hopper.

3. In a device of the class described, the combination of tongue-clamping members, a hopper connected pivotally with the same, a lever having a fixed point of attachment in advance of the hopper, and a connecting-rod attached to said lever and having hinged connection with the lower edge of the hopper.

4. In a device of the class described, the combination of tongue-clamping members, a hopper hingedly connected with the same and provided with a seed-slide, an adjusting-lever, a rod connected with said lever and having hinged connection with the hopper, a tappet-arm connected pivotally with the lever and having a flexible connection with the seed-slide, and supporting and retracting means for said tappet-arm.

5. In a device of the class described, a hopper having a seed-slide, a tappet-arm having flexible connection with said seed-slide and extended into the path of the spokes of one of the wheels of the wheeled supporting-frame, of retracting means for said tappet-arm, and hinged supporting means for the hopper, whereby the latter may be swung to a tilted position, thereby withdrawing the tappet-arm from the path of the spokes of the engaging wheel.

In testimony that I claim the foregoing as my own I have hereto affixed my signature in the presence of two witnesses.

THOMAS O. KIRK.

Witnesses:
J. S. GREEN,
J. H. LANE.